US012726069B2

(12) United States Patent
Kurita et al.

(10) Patent No.: US 12,726,069 B2
(45) Date of Patent: Sep. 1, 2026

(54) COIL WIRE ROD MADE FROM TWISTED PLURALITY OF STRANDS HAVING CUT OUTS AND CORNERS FOR STATOR, ELECTRICAL MACHINE

(71) Applicant: MITSUBISHI HEAVY INDUSTRIES, LTD., Tokyo (JP)

(72) Inventors: Satoshi Kurita, Tokyo (JP); Takeshi Ikemi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 451 days.

(21) Appl. No.: 18/118,504

(22) Filed: Mar. 7, 2023

(65) Prior Publication Data

US 2023/0318385 A1 Oct. 5, 2023

(30) Foreign Application Priority Data

Mar. 30, 2022 (JP) ................................ 2022-056856

(51) Int. Cl.

*H02K 3/48* (2006.01)
*H02K 1/16* (2006.01)
*H02K 3/12* (2006.01)
*H02K 15/04* (2006.01)

(52) U.S. Cl.

CPC ................ *H02K 3/48* (2013.01); *H02K 1/16* (2013.01); *H02K 3/12* (2013.01); *H02K 15/04* (2013.01)

(58) Field of Classification Search

CPC ........... H02K 3/48; H02K 3/12; H02K 15/04; H02K 1/16
USPC ................................................ 310/208, 196
See application file for complete search history.

(56) References Cited

U.S. PATENT DOCUMENTS 3,079,519 A * 2/1963 Kitson, Jr. ............... H02K 3/44 29/605
3,252,117 A * 5/1966 Fischer ................. H01F 27/323 336/185
4,329,539 A * 5/1982 Tanaka .................. H10N 60/80 72/286
4,431,860 A * 2/1984 Perco .................... H01B 7/306 174/113 A
6,072,259 A * 6/2000 Kawabata ................ H02K 3/38 310/216.115

(Continued)

FOREIGN PATENT DOCUMENTS

JP 2008147062 A * 6/2008
JP 2014-96349 A 5/2014

(Continued)

OTHER PUBLICATIONS

JP2008147062A English Translation.*
JP2014096349A English Translation.*

*Primary Examiner* — Maged M Almawri
(74) *Attorney, Agent, or Firm* — Birch, Stewart, Kolasch & Birch, LLP

(57) ABSTRACT

A coil wire rod includes a conductor formed of a conductive material, having a uniform outer peripheral shape, and extending in a direction of an axis. The conductor is divided by a division region having a radial shape around the axis in a cross-sectional view orthogonal to the direction of the axis and includes a plurality of stranded wires each extending in the direction of the axis. The division region is twisted about the axis toward the direction of the axis in at least a part in the direction of the axis.

18 Claims, 14 Drawing Sheets

(56) References Cited

U.S. PATENT DOCUMENTS 6,137,201 A * 10/2000 Umeda .................... H02K 9/06 310/201
6,247,225 B1 * 6/2001 Snitchler .............. H10N 60/203 29/599
6,404,092 B1 * 6/2002 Baumann ............... H02K 15/12 310/201
6,768,240 B2 * 7/2004 Younsi ..................... H02K 3/14 310/201
8,952,256 B2 * 2/2015 Baumann ................. H02K 3/40 174/138 R
9,197,107 B2 * 11/2015 Okumura ................. H02K 3/12
10,937,564 B2 * 3/2021 Goto ...................... H01B 7/303
11,623,198 B2 * 4/2023 Goto .................. G01N 21/1717 310/311
12,062,955 B2 * 8/2024 Lenoir ..................... H02K 3/28
2002/0029897 A1 * 3/2002 Younsi ..................... H02K 3/40 174/120 R
2004/0007933 A1 * 1/2004 Hsu ........................ H02K 1/146 310/194
2009/0072653 A1 * 3/2009 Harada .................... H02K 3/18 29/596
2009/0174278 A1 * 7/2009 Sheaffer ................... H02K 3/30 310/201
2010/0244615 A1 * 9/2010 Kouda ..................... H02K 3/48 310/215
2013/0127289 A1 * 5/2013 Koga ........................ H01F 5/00 174/113 R
2014/0049352 A1 * 2/2014 Trimmel ................ H01B 7/306 174/117 FF
2014/0062647 A1 * 3/2014 Trimmel ................ H01B 7/306 174/36
2014/0159518 A1 * 6/2014 Haldemann .............. H02K 3/14 310/59
2014/0197709 A1 7/2014 Hasegawa
2014/0353000 A1 * 12/2014 Yin .......................... H01B 3/04 156/185
2015/0114676 A1 * 4/2015 Vienne ................... H01B 7/306 174/34
2017/0033631 A1 * 2/2017 Conley .................. H02K 15/04
2017/0033634 A1 * 2/2017 Nikrandt ................ H02K 15/12
2018/0182507 A1 * 6/2018 Gronowski .............. H02K 3/14
2019/0149006 A1 * 5/2019 Mura ................... H02K 15/105 310/90
2023/0107844 A1 * 4/2023 Prater .................. H02K 44/085 310/11

FOREIGN PATENT DOCUMENTS

JP 2014-135240 A 7/2014
JP 2016-39662 A 3/2016
JP 6147600 B2 * 6/2017
JP 2020-514960 A 5/2020

* cited by examiner

COIL WIRE ROD MADE FROM TWISTED PLURALITY OF STRANDS HAVING CUT OUTS AND CORNERS FOR STATOR, ELECTRICAL MACHINE

CROSS-REFERENCE TO RELATED APPLICATIONS

This application claims the benefit of priority to Japanese Patent Application Number 2022-056856 filed on Mar. 30, 2022. The entire contents of the above-identified application are hereby incorporated by reference.

TECHNICAL FIELD

The disclosure relates to a coil wire rod, a manufacturing method for the coil wire rod, a stator, and an electric motor.

RELATED ART

When a magnetic flux interlinks with a conductor, current is generated to generate a magnetic flux in a direction opposite to the magnetic flux in the conductor. A loss due to the current is generally called an eddy current loss. For reducing the eddy current loss, it is effective to reduce the conductor dimension in the direction perpendicular to the magnetic flux.

In a known coil of an electric motor with a plurality of wires bundled and wound, a difference in inductance due to a difference in wire positions occurs, and a deviation in magnitude of current flowing through the wires occurs particularly in a high frequency range. Deviation of the current increases a copper loss occurring in the coil as compared with uniform flow of the current. This increased loss is generally called a circulating current loss.

For reducing the circulating current loss, it is effective to reduce the difference in wire positions. Known techniques for this include a configuration using a litz wire in which a plurality of wires is twisted and a technique called transposition of forming a coil while changing a relative position of a wire conductor (for example, see JP 2020-514960 T).

The sum of the eddy current loss and the circulating current loss described above is generally called an alternating-current loss.

SUMMARY

Unfortunately, in achieving the transposition as described above, the stranded wire is formed by twisting the wires, causing irregularities on the outer surface of the stranded wire. This decreases a space factor in a slot when the stranded wire is accommodated in the slot. As a result, the copper loss of the direct current may increase.

The disclosure has been made to solve the above problems, and an object of the disclosure is to provide a coil wire rod that can further suppress copper loss, a manufacturing method for the coil wire rod, a stator, and an electric motor.

To solve the above problems, a coil wire rod according to the disclosure includes a conductor formed of a conductive material, having a uniform outer peripheral shape, and extending in a direction of an axis. The conductor is divided by a division region having a radial shape around the axis in a cross-sectional view orthogonal to the direction of the axis and includes a plurality of stranded wires each extending in the direction of the axis. The division region is twisted about the axis toward the direction of the axis in at least a part in the direction of the axis.

A manufacturing method for a coil wire rod according to the disclosure, which is a method for manufacturing the coil wire rod described above, includes a step of sequentially forming, by additive manufacturing, the plurality of stranded wires until being divided by the division region.

A stator according to the disclosure includes a yoke having an annular shape and extending in the direction of the axis, a plurality of teeth protruding inward in a radial direction from an inside surface of the yoke and arrayed at intervals in a circumferential direction, and coils having the coil wire rod wound around the teeth. The teeth include a tooth body connected to the inside surface of the yoke and extending in a radial direction and a flange portion overhanging in a circumferential direction from an end portion inward in the radial direction of the tooth body. In the coil wire rod located at a connection portion between the tooth body and the flange portion of a plurality of the coil wire rods included in the coils, at least one corner facing an outer periphery side with respect to the axis of outside surfaces of the plurality of stranded wires forms an arc shape when viewed from the direction of the axis.

A stator according to the disclosure includes a yoke having an annular shape and extending in the direction of the axis, a plurality of teeth protruding inward in a radial direction from an inside surface of the yoke and arrayed at intervals in a circumferential direction, and coils having the coil wire rod wound around the teeth. The teeth include a tooth body connected to the inside surface of the yoke and extending in a radial direction and a flange portion overhanging in a circumferential direction from an end portion inward in the radial direction of the tooth body. In the coil wire rod located outside in a circumferential direction of the flange portion of a plurality of the coil wire rods included in the coils, at least one corner facing an outer periphery side with respect to the axis of outside surfaces of the plurality of stranded wires forms an arc shape when viewed from the direction of the axis.

An electric motor according to the disclosure includes a rotor extending along a center axis and the stator covering the rotor from an outer periphery side.

The disclosure can provide a coil wire rod that can further suppress copper loss, a manufacturing method for the coil wire rod, a stator, and an electric motor.

BRIEF DESCRIPTION OF DRAWINGS

The disclosure will be described with reference to the accompanying drawings, wherein like numbers reference like elements.

DESCRIPTION OF EMBODIMENTS

First Embodiment

Hereinafter, a coil wire rod 40 according to a first embodiment of the disclosure, a manufacturing method for the coil wire rod 40, a stator 20, and an electric motor 1 will be described with reference to FIGS. 1 to 5.

Configuration of Electric Motor

Figure 1:
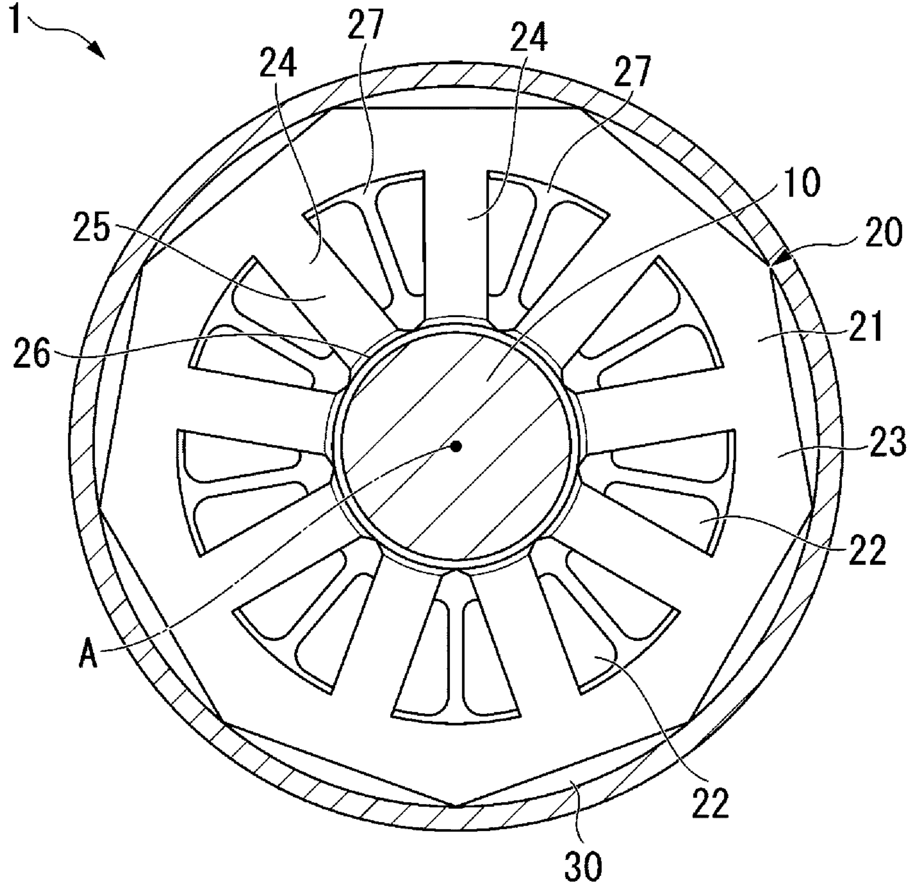
FIG. 1 is a cross-sectional view illustrating a configuration of an electric motor according to a first embodiment of the disclosure.

As illustrated in FIG. 1, the electric motor 1 includes a rotor 10, the stator 20, and a housing 30. The rotor 10 has a columnar shape around a center axis A. The rotor 10 includes a permanent magnet not illustrated. The rotor 10 is rotatable about the center axis A, and a shaft end thereof is supported by a bearing or the like.

The stator 20 covers the rotor 10 from an outer periphery side. The stator includes a stator core 21 and a coil 22. The stator core 21 includes a yoke 23 and teeth 24. The yoke 23 has an annular shape around the center axis A. The plurality of teeth 24 protrudes inward in a radial direction from an inside surface of the yoke 23 and is arrayed at equal intervals in the circumferential direction. In the present embodiment, nine teeth 24 are provided as an example, but the number of the teeth 24 may be 8 or less or 10 or more.

The teeth 24 include a tooth body 25 and a flange portion 26. The tooth body 25 extends in a radial direction from the inside surface of the yoke 23. The circumferential dimension (that is, width dimension) of the tooth body 25 is constant over the entire area in the radial direction. An end portion (tip end) inward in a radial direction of the tooth body 25 is provided with a flange portion 26. The flange portion 26 overhangs from the tip end of the tooth body 25 to both sides in the circumferential direction. The flange portion 26 is provided to prevent the coil 22 attached to the tooth body 25 from falling off.

A space between a pair of the teeth 24 adjacent to each other in the circumferential direction is called a slot 27. The coil 22 is arranged in the slot 27. The volume occupied by the coil 22 in the slot 27 may be referred to as a space factor.

The coil 22 is formed by winding the coil wire rod 40 described later around the tooth body 25 multiple times. When current is supplied to the coil 22, an electromagnetic force is generated by a magnetic field occurring between a permanent magnet of the rotor 10 and the coil 22 of the stator 20, and the rotor is rotationally driven about the center axis A. Rotation of the rotor 10 is taken out from the shaft end and used for various uses.

By having a tubular shape around the center axis A, the housing 30 covers the stator 20 from the outer periphery side. As an example, the stator 20 is fixed to the inside surface of the housing 30 by press-fit.

Configuration of Coil Wire Rod

Next, the configuration of the coil wire rod 40 will be described with reference to FIGS. 2 to 4. In the following description, a case where the coil wire rod 40 extends linearly will be described, and a line passing through the center in the cross section of the coil wire rod 40 is referred to as an axis X.

Figure 2:
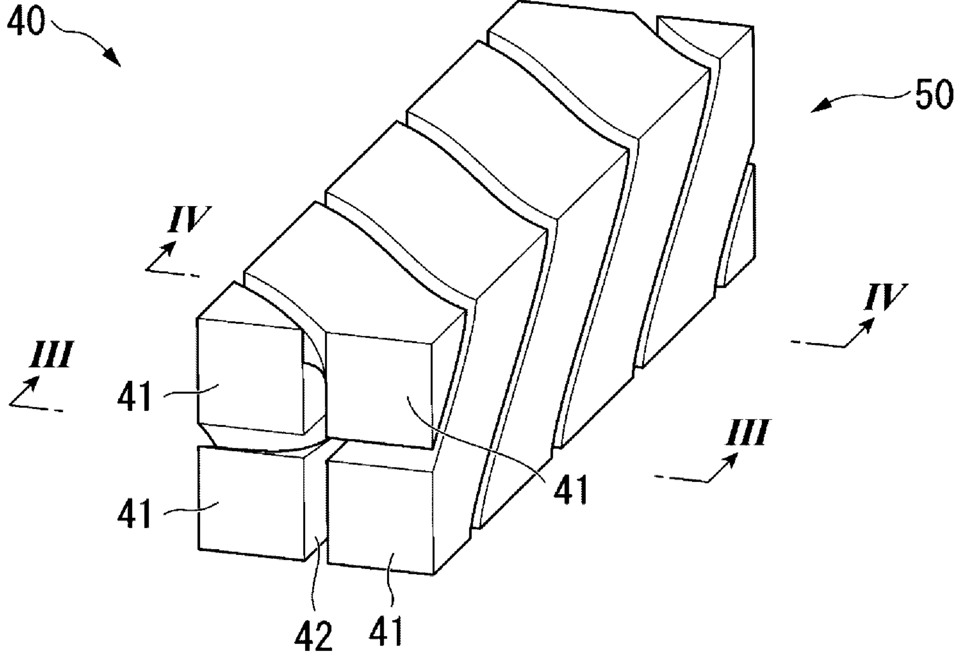
FIG. 2 is a perspective view illustrating a configuration of a coil wire rod according to the first embodiment of the disclosure.

As illustrated in FIG. 2, the coil wire rod 40 includes a conductor 50 formed of a conductive material such as copper. The conductor 50 has a prismatic shape extending in the axis X direction. That is, the contour of the cross-sectional shape of the conductor 50 is rectangular. The outer peripheral shape of the conductor 50 is uniform over the entire area in the axis X direction. The term “uniform” mentioned here means that the contour line of the cross section when viewed from the axis X direction does not change over the entire area in the axis X direction.

The conductor 50 includes a plurality of (four) stranded wires 41. The four stranded wires 41 are annularly arranged side by side in the circumferential direction with reference to the axis X. A gap is formed between each of the stranded wires 41. This gap is a division region 42. That is, this division region 42 divides the cross section of the conductor 50 into four. The division region 42 extends radially around the axis X. In the present embodiment, the division region 42 has a cross shape when viewed from the axis X direction.

Figure 3:
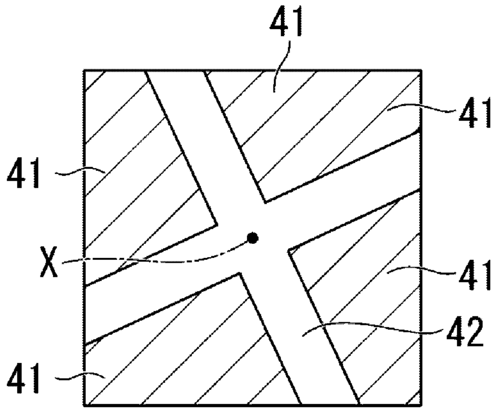
FIG. 3 is a cross-sectional view taken along a line in FIG. 2.
Figure 4:
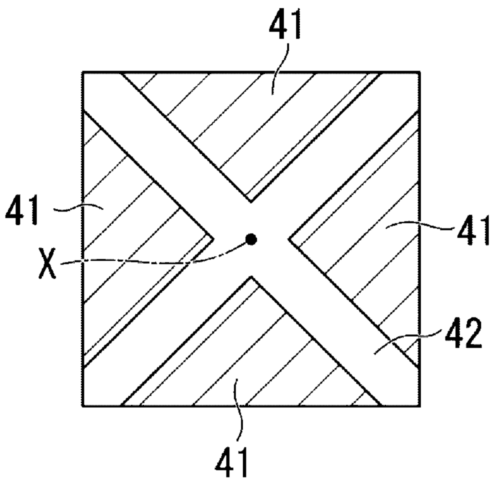
FIG. 4 is a cross-sectional view taken along a line IV-IV in FIG. 2.

As illustrated in FIGS. 3 and 4, the division region 42 is twisted about the axis X from one side toward the other side in the axis X direction. That is, the angle of the division region 42 about the axis X changes as illustrated in FIG. 3 from the end surface of the coil wire rod 40 illustrated in FIG. 2 toward the other side in the axis X direction. As illustrated in FIG. 4, the angle of the division region 42 about the axis X further changes from the position of FIG. 3 toward the other side in the axis X direction. On the other hand, as illustrated in these figures, the cross-sectional shape (shape of the contour line) as the conductor 50 remains square and is uniform. Since such a change in angle of the division region 42 continuously occurs over the axis X direction, the four stranded wires 41 are entangled with one another twisting about the axis X.

Manufacturing Method for Coil Wire Rod

Figure 5:
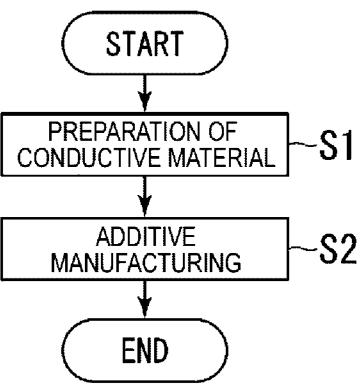
FIG. 5 is a flowchart illustrating each process of a manufacturing method for the coil wire rod according to the first embodiment of the disclosure.

Next, a manufacturing method for the coil wire rod 40 will be described with reference to FIG. 5. This manufacturing method includes step S1 of preparing for a conductive material and step S2 of laminating and shaping the coil wire rod 40 with the conductive material.

In step S1, fine powder of a conductive material such as copper described above is prepared. In subsequent step S2, the coil wire rod 40 is shaped to have the above-described shape by additive manufacturing. This shaping method gives a predetermined shape by melting copper fine powder by irradiating the copper fine powder with laser and then curing the copper fine powder. By repeating this treatment over a plurality of successive layers, the coil wire rod 40 is obtained in a state where the above-described shape is maintained. For example, when the coil wire rod 40 additively manufactures the coil 22, a method of laminating in the direction of the central line of the coil 22 having an annular shape is conceivable.

Operational Effects

Here, in a coil where a plurality of wires is bundled and wound, it is known that a difference occurs in inductance due to a difference in magnetic flux interlinked with the coil of each wire, and a deviation occurs in magnitude of current flowing through the wires particularly in a high frequency range. When the current is deviated, copper loss occurring in the coil increases as compared with a case where the current uniformly flows. This increased loss is generally called an alternating-current loss.

In order to reduce alternating-current loss, it is effective to reduce the difference in amount of interlinkage magnetic flux between the wires. As a technique for this, a configuration using a litz wire in which a plurality of wires is twisted has been known. However, when wires are twisted to form a stranded wire, irregularities occur on the outer surface of the stranded wire. That is, spiral irregularities occur between the stranded wires, and the outer peripheral shape changes (becomes not uniform) as compared with that before twisting. This decreases the space factor in the slot when the coil is accommodated in the slot. As a result, the copper loss of the direct current may increase.

Therefore, the coil wire rod 40 according to the present embodiment adopts the above-described configuration. According to the above configuration, the conductor 50 is formed of the plurality of stranded wires 41 while the outer peripheral shape (contour of the cross section) of the conductor 50 is uniformly square over the entire area in the axis X direction. This reduces irregularities occurring on the outside surface as compared with the case where the wire rod is formed by twisting wires having a rectangular cross-sectional shape, for example. As a result, when forming the coil 22 in the slot 27, the gap between the coil wire rods 40 can be reduced. In other words, the space factor of the coil 22 in the slot 27 can be increased. This makes it possible to greatly reduce the copper loss occurring in the coil 22. Therefore, the efficiency of the electric motor 1 using the coil wire rod 40 can be improved.

These stranded wires 41 are divided into one another by the division region 42 extending radially around the axis X. Furthermore, the division region 42 is twisted about the axis X toward the axis X direction. When such a shape is achieved by additive manufacturing, no residual stress occurs in each of the stranded wires 41, and therefore the loss (iron loss) occurring by the residual stress can also be reduced. On the other hand, in a case where a wire rod is formed by twisting wires that initially has a linear shape, residual stress occurs inside the wire on the basis of plastic deformation when the wire is twisted. As a result, there is a possibility of an increase in the iron loss. The configuration and the manufacturing method according to the present embodiment can reduce the possibility of occurrence of such a loss.

The first embodiment of the disclosure has been described above. Note that various changes and modifications can be made to the above-described configurations without departing from the gist of the disclosure.

Second Embodiment

Next, a coil wire rod 140 and the stator 20 according to the second embodiment of the disclosure will be described with reference to FIGS. 6 and 7. The same components as those of the first embodiment are denoted by the same reference signs, and detailed description thereof will be omitted.

Figure 6:
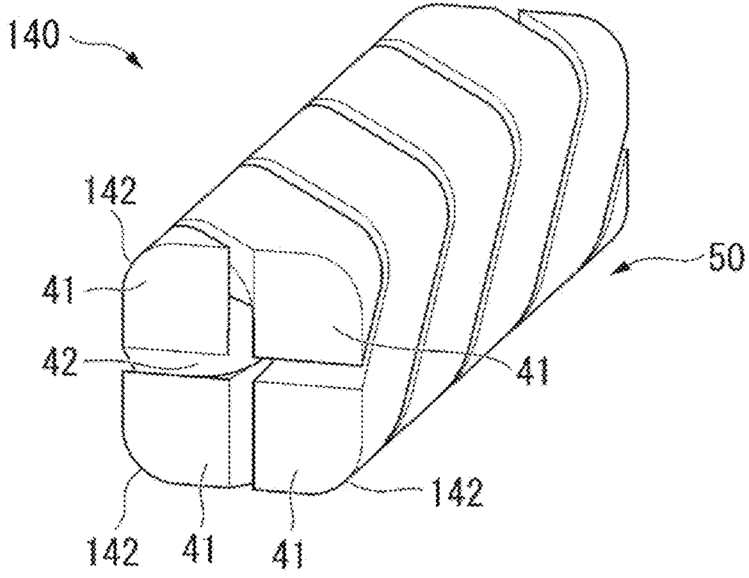
FIG. 6 is a perspective view illustrating a configuration of a coil wire rod according to a second embodiment of the disclosure.

As illustrated in FIG. 6, the coil wire rod 140 has the cross-sectional shape of the stranded wire 41 different from that of the first embodiment. Specifically, the corner facing the outer periphery side of the stranded wire 41 having a rectangular shape is formed in an arc shape to form an arc surface 142. (Here, the outer periphery side mentioned here refers to an outward in a radial direction around the axis X) In other words, the corners on the outer periphery side of the stranded wire 41 are chamfered. In other words, the outer peripheral shape of the conductor 50 has a rectangular shape without right-angled corners.

According to the above configuration, since the corner facing the outer periphery side of the stranded wire 41 has an arc shape, it is possible to reduce the eddy current loss occurring in a large amount at the right-angled corners as compared with the case where the corner has a right angle shape, that is, the stranded wire 41 has a square cross section. By forming the coil 22 using such the coil wire rod 140, the loss occurring in the coil 22 can further greatly be reduced. As a result, the efficiency of the electric motor 1 using the coil 22 can further be improved.

Figure 7:
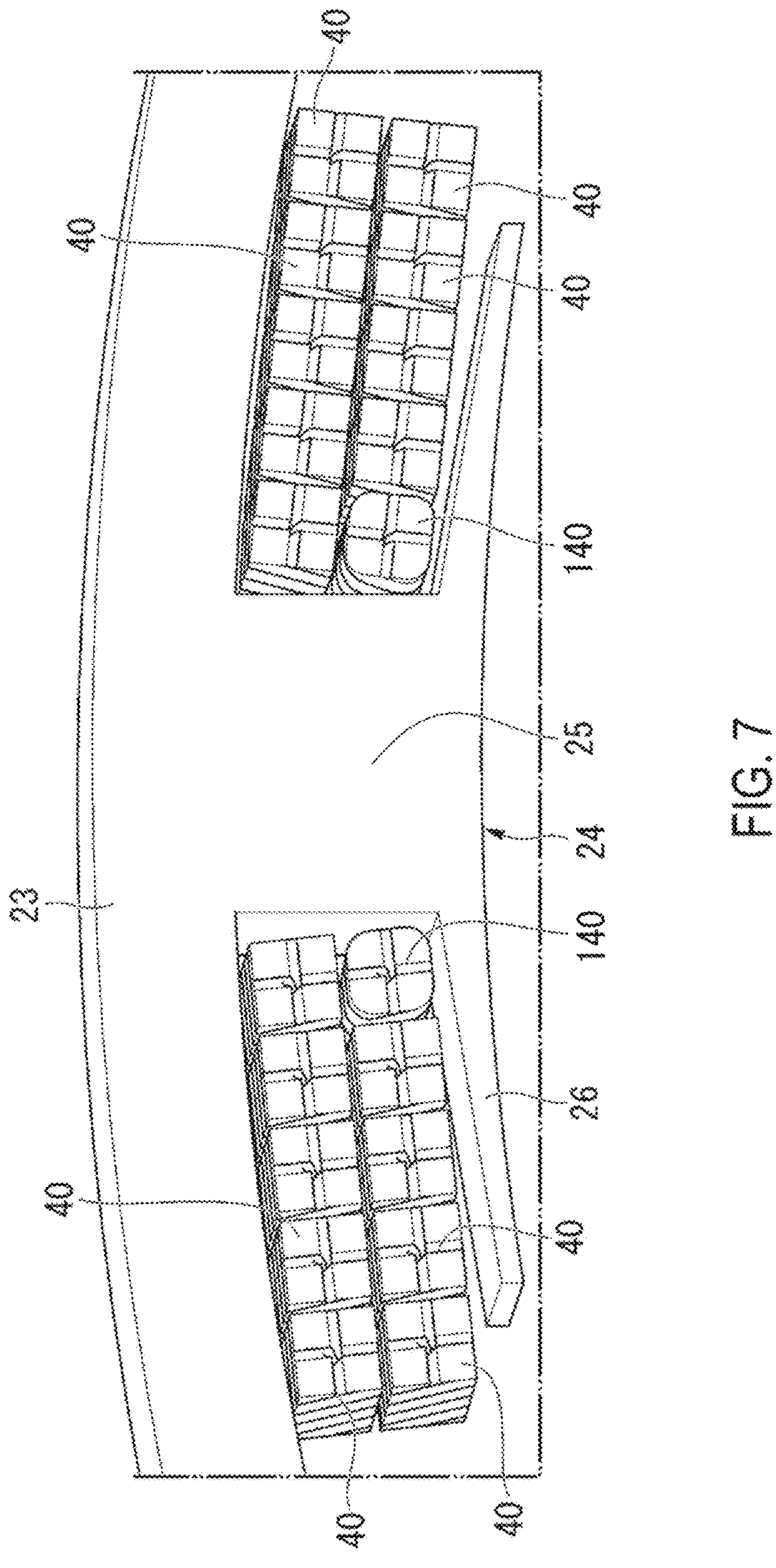
FIG. 7 is an enlarged cross-sectional view of a main part of a stator according to the second embodiment of the disclosure.

The coil wire rod 140 is particularly desirably used in the position illustrated in FIG. 7. Specifically, the coil wire rod 140 is desirably used for a connection portion (corner) between the tooth body 25 and the flange portion 26. It is known that eddy current loss is likely to occur in such a connection portion. Preferentially arranging the coil wire rod 140 at the connection portion can more actively reduce the eddy current loss. As a result, the efficiency of the electric motor 1 can further be improved.

The second embodiment of the disclosure has been described above. Note that various changes and modifications can be made to the above-described configurations without departing from the gist of the disclosure.

Figure 8:
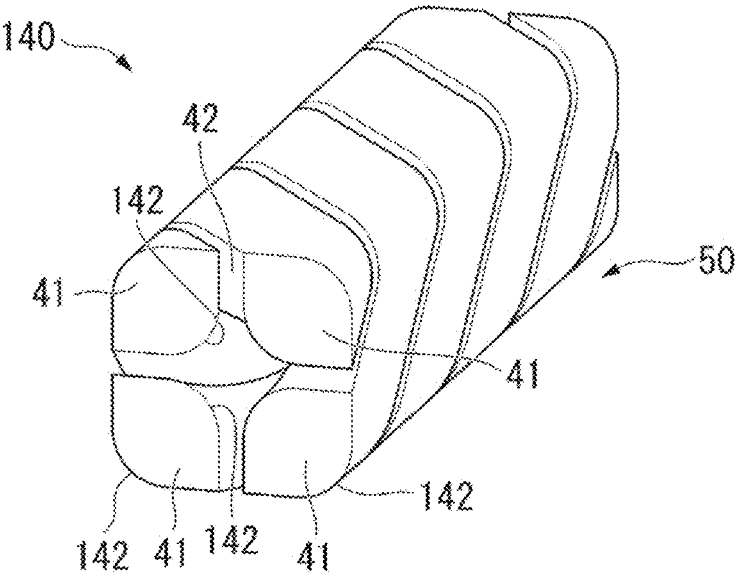
FIG. 8 is a perspective view illustrating a modification example of the coil wire rod according to the second embodiment of the disclosure.

For example, as illustrated in FIG. 8, a corner facing the inner periphery side of the stranded wire 41 forming the coil wire rod 140 can be formed in an arc shape similarly to the corner on the outer periphery side. This configuration can further reduce the eddy current loss as compared with the configuration of the second embodiment.

Third Embodiment

Figure 9:
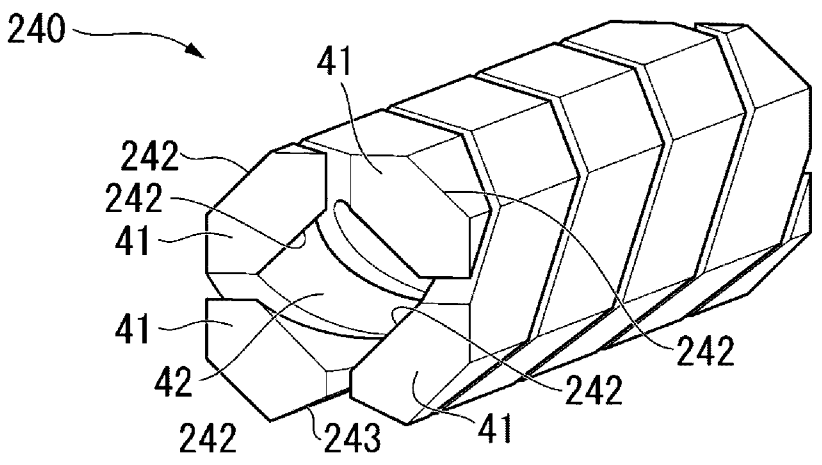
FIG. 9 is a perspective view illustrating a configuration of a coil wire rod according to a third embodiment of the disclosure.

Next, a coil wire rod 240 according to the third embodiment of the disclosure will be described with reference to FIG. 9. The same components as those in each of the above-described embodiments will be denoted by the same reference signs, and a detailed description thereof will be omitted. As illustrated in the figure, in the coil wire rod 240, corners facing the outer periphery side and corners facing the inner periphery side of the four stranded wires 41 each have a flat shape (a flat surface 242 is formed). That is, the contour of the cross section of the conductor 50 has a substantially octagonal shape. That is, together with the case of the coil wire rod 140 according to the second embodiment described above, a cutout is formed at corners of the stranded wire 41 when viewed from the axis X direction. The cutout is a concept including an arc-shaped corner and a flat corner.

Furthermore, a recessed groove 243 extending in the axis X direction and recessed toward the inner periphery side is formed on one of the surfaces between the pair of flat parts adjacent to each other.

According to the above configuration, since the corner facing the outer periphery side of the stranded wire 41 has a flat shape, it is possible to reduce the eddy current loss that occurs frequently when the corner has a right-angled shape.

Furthermore, according to the above configuration, when configuring the coil 22, by arranging the recessed groove 243 of the conductor 50 to face the rotor 10 side of the electric motor 1, it is also possible to reduce local copper loss based on the magnetic force of the rotor 10. That is, it is particularly desirable that the recessed groove 243 is formed on a surface facing the center axis A side of the electric motor 1. This can further improve the efficiency of the electric motor 1.

Figure 10:
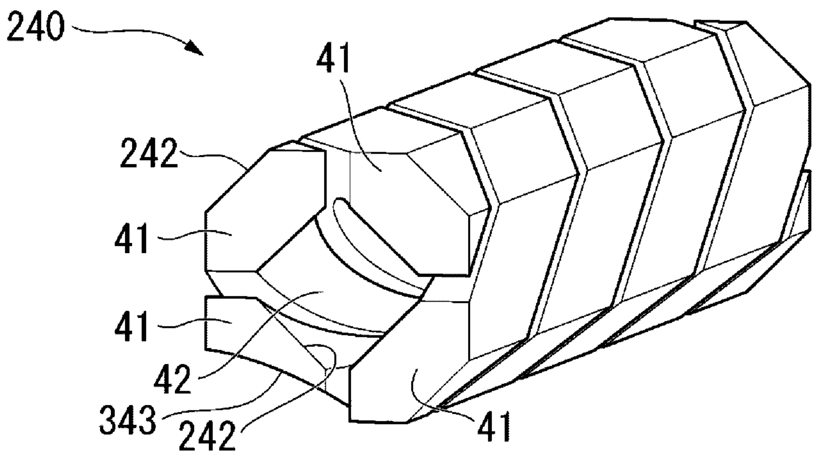
FIG. 10 is a perspective view illustrating a first modification example of the coil wire rod according to the third embodiment of the disclosure.

The third embodiment of the disclosure has been described above. Note that various changes and modifications can be made to the above-described configurations without departing from the gist of the disclosure. For example, as described in the second embodiment, the eddy current loss is likely to occur at the connection portion between the tooth body 25 and the flange portion 26. Therefore, in the coil wire rod 240 located at the connection portion, as illustrated in FIG. 10, it is desirable to form the recessed groove 343 such that a part of the cross section becomes left-right asymmetric with reference to the diametrical direction with respect to the axis X. This can further reduce the eddy current loss occurring at a connection portion.

Figure 11:
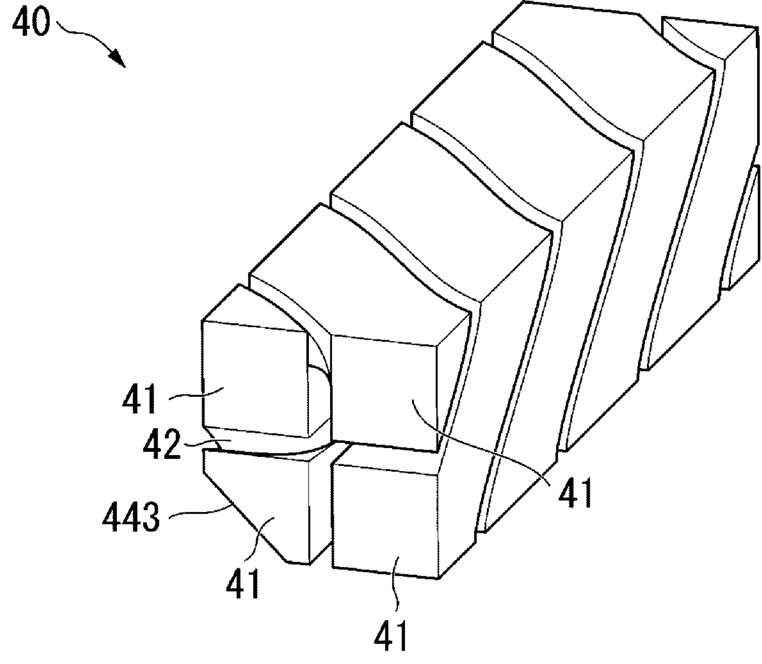
FIG. 11 is a perspective view illustrating a second modification example of the coil wire rod according to the third embodiment of the disclosure.

As a simpler aspect, as illustrated in FIG. 11, it is also possible to obtain the same operational effect as those of the recessed groove 243 by obliquely forming a cutout 443 in one of the stranded wires 41 each having a square shape described in the first embodiment.

Modification Examples Common to Each Embodiment

Figure 12:
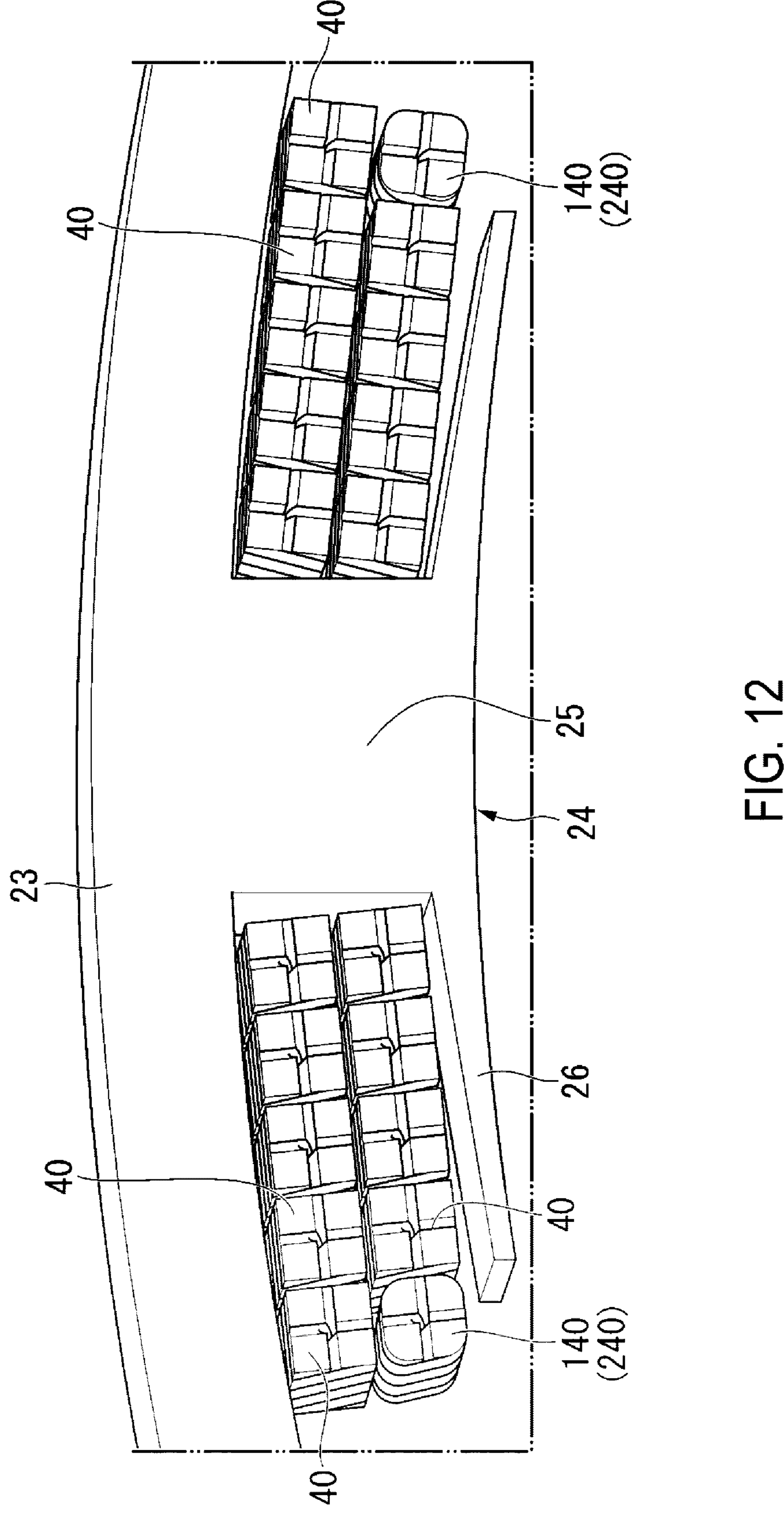
FIG. 12 is a cross-sectional view illustrating a configuration of a stator according to a first modification example common to each embodiment of the disclosure.

Next, modification examples common to each embodiment will be described with reference to FIGS. 12 to 14. The coil wire rod 140 described in the second embodiment and the coil wire rod 240 described in the third embodiment can also be arranged at positions illustrated in FIG. 12 as the first modification example. Specifically, these wire rods are arranged at positions outside in the circumferential direction relative to the flange portion 26 of the teeth 24. That is, it is desirable to arrange these wire rods in a region not covered with the flange portion 26 from the inner periphery side. In such a region, since the magnetic force of the permanent magnet of the rotor 10 temporally changes with rotation of the rotor 10, the eddy current loss is particularly likely to occur. Arranging the coil wire rod 140 or the coil wire rod 240 in the region can more actively reduce the eddy current loss. As a result, the efficiency of the electric motor 1 can further be improved. It is also possible to arrange these coil wire rods 140 and 240 in a region in contact with any one of the tooth body 25 and the flange portion 26.

Figure 13:
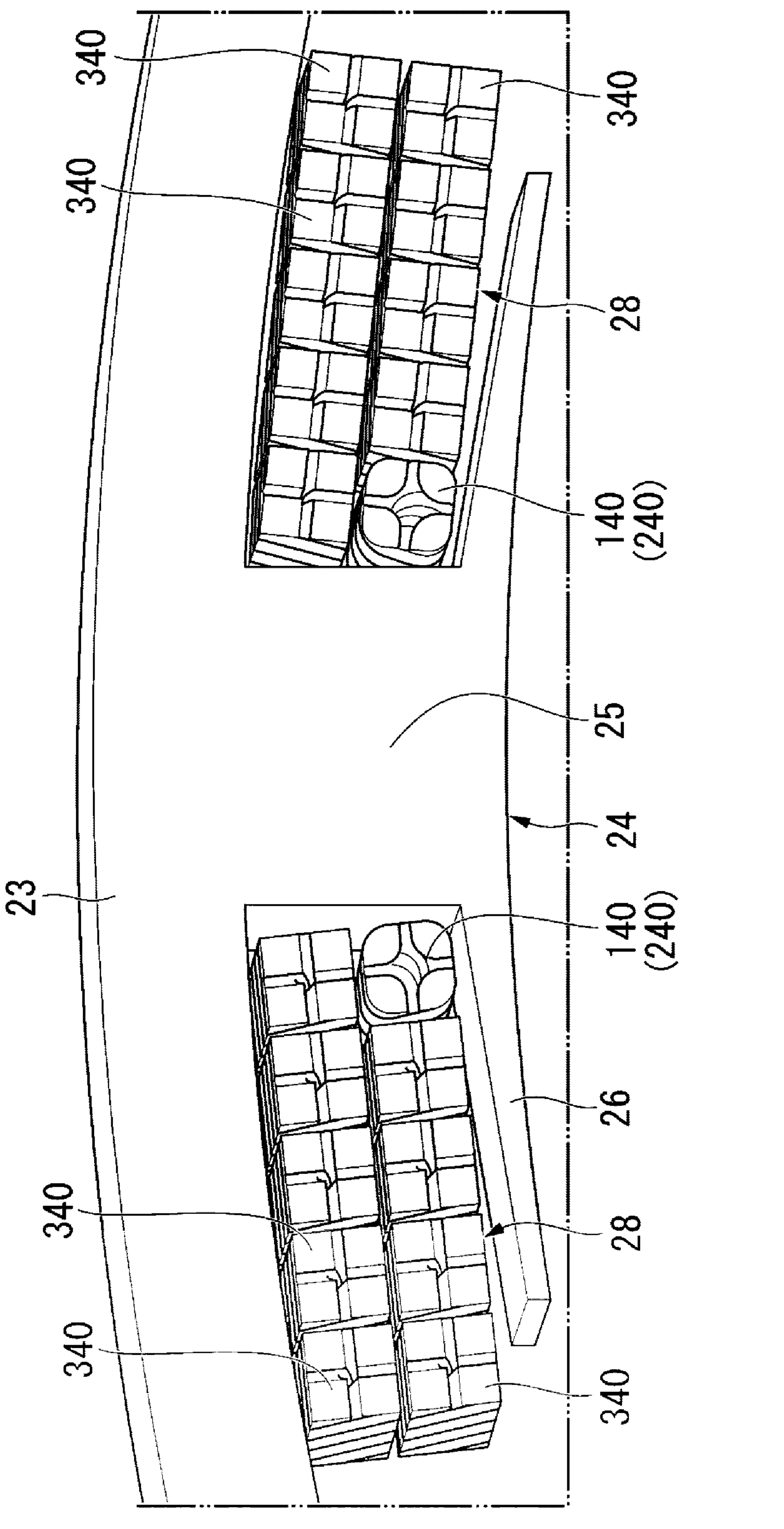
FIG. 13 is a cross-sectional view illustrating a configuration of a stator according to a second modification example common to each embodiment of the disclosure.
Figure 14:
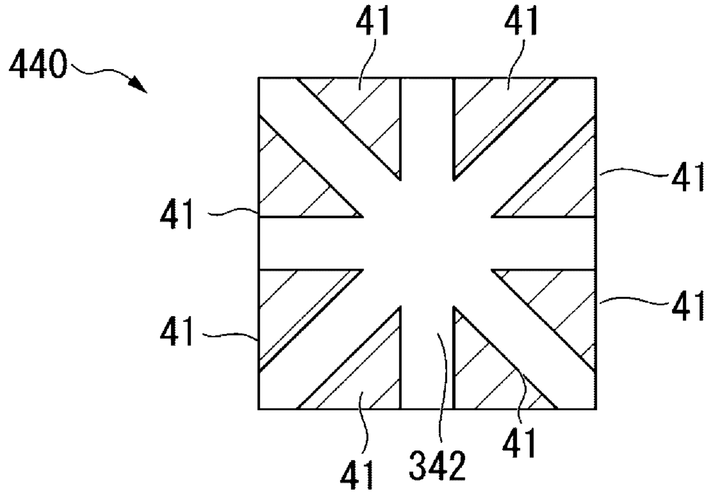
FIG. 14 is a cross-sectional view of a coil wire rod according to a modification example common to each embodiment of the disclosure.

As illustrated in FIG. 13 as the second modification example, it is also possible not to use the coil wire rod 140 and the coil wire rod 240 as described above in a region (a non-target region 28) excluding the connection portion between the tooth body 25 and the flange portion 26. Specifically, a coil wire rod 340 arranged in the non-target region 28 has a plurality of (four) wires having a prismatic shape extending along the axis X. That is, the coil wire rod 340 does not have the stranded wire 41. It is known that the alternating-current loss in the coil 22 tends to be smaller in such a non-target region 28 than in other areas.

Thus, the use of the coil wire rod 140 or the coil wire rod 240 only in a minimum necessary region can further improve the space factor of the coil 22, further improving the efficiency of the electric motor 1. In the coil wire rod 140 and the coil wire rod 240, since the division region 42 transitions twisting in the axis X direction as described above, the cross-sectional area of the conductor 50 increases or decreases depending on the position of the axis X depending on the area occupied by the division region 42. That is, the space factor becomes slightly smaller than that of the coil wire rod 340.

Furthermore, in each of the above-described embodiments, an example in which the division region 42 has a cross shape to form the four stranded wires 41 has been described. However, as in a coil wire rod 440 illustrated as a modification example in FIG. 14, a division region 342 may have a shape extending in six directions around the axis X. That is, the number of stranded wires 41 is not limited to 4 and may be 5 or more.

Notes

The coil wire rod 40 described in each embodiment, the manufacturing method for the coil wire rod 40, the stator 20, and the electric motor 1 are understood as follows, for example.

(1) The coil wire rod 40 according to a first aspect includes the conductor 50 formed of a conductive material, having a uniform outer peripheral shape, and extending in the axis X direction, in which the conductor 50 is divided by the division region 42 having a radial shape around the axis X in a cross-sectional view orthogonal to the axis X direction, the conductor 50 including the plurality of stranded wires 41 each extending in the axis X direction, and the division region 42 is twisted about the axis X toward the axis X direction in at least a part in the axis X direction.

According to the above configuration, the conductor 50 is formed of the plurality of stranded wires 41 while the outer peripheral shape of the conductor 50 is uniform. This can increase the space factor of the coil 22 when the coil 22 is formed in the slot 27. As a result, the copper loss can be reduced.

(2) The coil wire rod 40 according to a second aspect is the coil wire rod 40 of (1). At least one corner facing the outer periphery side with respect to the axis X of outside surfaces of the plurality of stranded wires 41 forms an arc shape when viewed from the axis X direction.

According to the above configuration, since the corner facing the outer periphery side of the stranded wire 41 has an arc shape, it is possible to reduce the eddy current loss that occurs frequently when the corner has a right-angled shape.

(3) The coil wire rod 40 according to a third aspect is the coil wire rod 40 of (1) or (2). At least one corner facing the inner periphery side with respect to the axis X of outside surfaces of the plurality of stranded wires 41 forms an arc shape when viewed from the axis X direction.

According to the above configuration, since the corner facing the inner periphery side of the stranded wire 41 has an arc shape, it is possible to reduce the eddy current loss that occurs frequently when the corner has a right-angled shape.

(4) The coil wire rod 40 according to a fourth aspect is the coil wire rod of (1). At least one corner facing the outer periphery side with respect to the axis X of outside surfaces of the plurality of stranded wires 41 forms a flat shape expanding in a direction orthogonal to a radial direction with respect to the axis X when viewed from the axis X direction.

According to the above configuration, since the corner facing the outer periphery side of the stranded wire 41 has a flat shape, it is possible to reduce the eddy current loss that occurs frequently when the corner has a right-angled shape.

(5) The coil wire rod 40 according to a fifth aspect is the coil wire rod 40 of (1) or (4). At least one corner facing the inner periphery side with respect to the axis X of outside surfaces of the plurality of stranded wires 41 forms a flat shape expanding in a direction orthogonal to a radial direction with respect to the axis X when viewed from the axis X direction.

According to the above configuration, since the corner facing the inner periphery side of the stranded wire 41 has a flat shape, it is possible to reduce the eddy current loss that occurs frequently when the corner has a right-angled shape.

(6) The coil wire rod 40 according to a sixth aspect is the coil wire rod according to any one aspect of (1) to (5), in which the recessed groove 243 extending in the axis X direction is formed in a part of an outside surface of the conductor 50.

According to the above configuration, arranging the recessed groove 243 of the conductor 50 to face the rotor 10 side of the electric motor 1 can reduce local copper loss based on the magnetic force of the rotor 10.

(7) The coil wire rod 40 according to a seventh aspect is the coil wire rod of (6), in which the recessed groove 243 has an asymmetric cross-sectional shape with reference to a diametrical direction with respect to the axis X.

According to the above configuration, the recessed groove 243 has an asymmetric cross-sectional shape, and thus, for example, when the recessed groove 243 is arranged opposite to the corner formed by the teeth 24 and the flange portion 26 it is possible to reduce the eddy current loss that is likely to occur at the corner.

(8) The manufacturing method for the coil wire rod according to an eighth aspect is the manufacturing method for the coil wire rod 40 according to any one aspect of (1) to (7), and includes a step of sequentially forming, by additive manufacturing, the plurality of stranded wires 41 until being divided by the division region 42.

According to the above method, since additive manufacturing is used, the plurality of stranded wires 41 can be shaped in a twisted state from the beginning. This reduces manufacturing cost. Since no residual stress occurs inside the stranded wire 41, iron loss based on the residual stress can also be reduced.

(9) The stator 20 according to a ninth aspect is the stator 20 including the yoke 23 annular around the center axis A, the plurality of teeth 24 protruding inward in a radial direction from an inside surface of the yoke 23 and arrayed at intervals in a circumferential direction, and the coils 22 having the coil wire rod according to any one aspect of (1) to (6) wound around the teeth 24. The teeth 24 include the tooth body 25 connected to the inside surface of the yoke 23 and extending in a radial direction and the flange portion 26 overhanging in a circumferential direction from an end portion inward in the radial direction of the tooth body 25. In the coil wire rod 40 located at a connection portion between the tooth body 25 and the flange portion 26 of a plurality of the coil wire rods 40 included in the coils 22, at least one corner facing an outer periphery side with respect to the axis X of outside surfaces of the plurality of stranded wires 41 is cut out when viewed from the axis X direction.

According to the above configuration, in the coil wire rod 40 located at the connection portion formed by the tooth body 25 and the flange portion 26, since the corner facing the outer periphery side of the stranded wire 41 is cut out, it is possible to reduce the eddy current loss that is likely to occur at the connection portion.

(10) The stator 20 according to a tenth aspect is the stator of (9). In the coil wire rod 40 located at a connection portion between the tooth body 25 and the flange portion 26 of the plurality of the coil wire rods 40 included in the coils 22, at least one corner facing an outer periphery side with respect to the axis X of outside surfaces of the plurality of stranded wires 41 forms an arc shape when viewed from the axis X direction.

According to the above configuration, in the coil wire rod 40 located at the connection portion formed by the tooth body 25 and the flange portion 26, since the corner facing the outer periphery side of the stranded wire 41 has an arc shape, it is possible to reduce the eddy current loss that is likely to occur at the connection portion.

(11) The stator 20 according to an eleventh aspect is the stator of (9). In the coil wire rod located at a connection portion between the tooth body 25 and the flange portion 26 of the plurality of the coil wire rods 40 included in the coils 22, at least one corner facing an outer periphery side with respect to the axis X of outside surfaces of the plurality of stranded wires 41 forms a flat shape expanding in a direction orthogonal to a radial direction with respect to the axis X when viewed from the axis X direction.

According to the above configuration, in the coil wire rod 40 located at the connection portion formed by the tooth body 25 and the flange portion 26, since the corner facing the outer periphery side of the stranded wire 41 has a flat shape, it is possible to reduce the eddy current loss that is likely to occur at the connection portion.

(12) The stator 20 according to a twelfth aspect is the stator 20 including the yoke 23 annular around the center axis, the plurality of teeth 24 protruding inward in a radial direction from an inside surface of the yoke 23 and arrayed at intervals in a circumferential direction, and the coils 22 having the coil wire rod according to any one aspect of (1) to (8) wound around the teeth 24. The teeth 24 include the tooth body 25 connected to the inside surface of the yoke 23 and extending in a radial direction and the flange portion 26 overhanging in a circumferential direction from an end portion inward in the radial direction of the tooth body 25. In the coil wire rod 40 in contact with any one of the tooth body 25 and the flange portion 26 of a plurality of the coil wire rods 40 included in the coils 22, at least one corner facing an outer periphery side with respect to the axis X of outside surfaces of the plurality of stranded wires 41 is cut out when viewed from the axis X direction.

According to the above configuration, in the coil wire rod 40 in contact with any one of the tooth body 25 and the flange portion 26, since the corner facing the outer periphery side of the stranded wire 41 is cut out, it is possible to reduce the eddy current loss that is likely to occur in the region.

(13) The stator 20 according to a thirteenth aspect is the stator of (12). In the coil wire rod 40 in contact with any one of the tooth body 25 and the flange portion 26 of the plurality of the coil wire rods 40 included in the coils 22, at least one corner facing an outer periphery side with respect to the axis X of outside surfaces of the plurality of stranded wires 41 forms an arc shape when viewed from the axis X direction.

According to the above configuration, in the coil wire rod 40 in contact with any one of the tooth body 25 and the flange portion 26, since the corner facing the outer periphery side of the stranded wire 41 forms an arc shape, it is possible to reduce the eddy current loss that is likely to occur in the region.

(14) The stator 20 according to a fourteenth aspect is the stator of (12). In the coil wire rod 40 in contact with any one of the tooth body 25 and the flange portion 26 of the plurality of the coil wire rods 40 included in the coils 22, at least one corner facing an outer periphery side with respect to the axis X of outside surfaces of the plurality of stranded wires 41 forms a flat shape expanding in a direction orthogonal to a radial direction with respect to the axis X when viewed from the axis X direction.

According to the above configuration, in the coil wire rod 40 in contact with any one of the tooth body 25 and the flange portion 26, since the corner facing the outer periphery side of the stranded wire 41 forms a flat shape, it is possible to reduce the eddy current loss that is likely to occur in the region.

(15) The stator 20 according to a fifteenth aspect is the stator 20 according to any one aspect of (9) to (14). In the coil wire rod 40 located at a connection portion between the tooth body 25 and the flange portion 26 of the plurality of the coil wire rods 40 included in the coils 22, at least one corner facing an inner periphery side with respect to the axis X of outside surfaces of the plurality of stranded wires 41 is cut out when viewed from the axis X direction.

According to the above configuration, in the coil wire rod 40 located at the connection portion formed by the tooth body 25 and the flange portion 26, since the corner facing the inner periphery side of the stranded wire 41 is cut out, it is possible to reduce the eddy current loss that is likely to occur at the connection portion.

(16) The stator 20 according to a sixteenth aspect is the stator 20 according to any one aspect of (9) to (15). In the coil wire rod 40 located outside in the circumferential direction of the flange portion 26 of the plurality of the coil wire rods 40 included in the coils 22, at least one corner facing an outer periphery side with respect to the axis X of outside surfaces of the plurality of stranded wires 41 is cut out when viewed from the axis X direction.

Here, the magnetic flux interlinked with the coil wire rod 40 located outside the flange portion 26 temporally changes with rotation of the rotor 10. According to the above configuration, in the coil wire rod 40 located outside the flange portion 26, a corner on the outer periphery side of the stranded wire 41 is cut out. This can reduce the eddy current loss based on the temporal change.

(17) The stator 20 according to a seventeenth aspect is the stator 20 including the yoke 23 annular around the center axis A, the plurality of teeth 24 protruding inward in a radial direction from an inside surface of the yoke 23 and arrayed at intervals in a circumferential direction, and the coils 22 having the coil wire rod 40 according to any one aspect of (1) to (6) wound around the teeth 24. The teeth 24 include the tooth body 25 connected to the inside surface of the yoke 23 and extending in a radial direction and the flange portion 26 overhanging in a circumferential direction from an end portion inward in the radial direction of the tooth body 25. In the coil wire rod 40 located outside in the circumferential direction of the flange portion 26 of a plurality of the coil wire rods 40 included in the coils 22, at least one corner facing an outer periphery side with respect to the axis X of outside surfaces of the plurality of stranded wires 41 is cut out when viewed from the axis X direction.

Here, the magnetic flux interlinked with the coil wire rod 40 located outside the flange portion 26 temporally changes with rotation of the rotor 10. According to the above configuration, in the coil wire rod 40 located outside the flange portion 26, a corner on the outer periphery side of the stranded wire 41 is cut out. This can reduce the eddy current loss based on the temporal change.

(18) The electric motor 1 according to an eighteenth aspect includes the rotor 10 extending along the center axis A and the stator 20 according to any one aspect of (9) to (17) covering the rotor 10 from an outer periphery side.

The above configuration can provide the electric motor 1 that can be efficiently driven by further reducing the copper loss.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A coil wire rod, comprising:

a conductor formed of a conductive material, having a uniform outer peripheral shape, and extending in a direction of an axis, wherein the conductor is divided by a division region having a radial shape around the axis in a cross-sectional view orthogonal to the direction of the axis and includes a plurality of stranded wires each extending in the direction of the axis, the plurality of stranded wires are annularly arranged side by side in the circumferential direction, the division region is a gap between each of the plurality of stranded wires in the circumferential direction, and the division region is twisted about the axis toward the direction of the axis in at least a part in the direction of the axis.

2. The coil wire rod according to claim 1, wherein at least one of corners facing an outer periphery side with respect to the axis of outside surfaces of the plurality of stranded wires forms an arc shape when viewed from the direction of the axis.

3. The coil wire rod according to claim 1, wherein at least one of corners facing an inner periphery side with respect to the axis of outside surfaces of the plurality of stranded wires forms an arc shape when viewed from the direction of the axis.

4. The coil wire rod according to claim 1, wherein at least one of corners facing an outer periphery side with respect to the axis of outside surfaces of the plurality of stranded wires forms a flat shape expanding in a direction orthogonal to a radial direction with respect to the axis when viewed from the direction of the axis.

5. The coil wire rod according to claim 1, wherein at least one of corners facing an inner periphery side with respect to the axis of outside surfaces of the plurality of stranded wires forms a flat shape expanding in a direction orthogonal to a radial direction with respect to the axis when viewed from the direction of the axis.

6. A manufacturing method for the coil wire rod according to claim 1, the manufacturing method comprising a step of sequentially forming, by additive manufacturing, the plurality of stranded wires until being divided by the division region.

7. A stator, comprising:

a yoke annular around a center axis;

a plurality of teeth protruding inward in a radial direction from an inside surface of the yoke and arrayed at intervals in a circumferential direction; and coils having the coil wire rod according to claim 1 wound around the teeth, wherein the teeth include a tooth body connected to the inside surface of the yoke and extending in a radial direction and a flange portion overhanging in a circumferential direction from an end portion inward in the radial direction of the tooth body, and in the coil wire rod located outside in a circumferential direction of the flange portion of a plurality of the coil wire rods included in the coils, at least one of corners facing an outer periphery side with respect to the axis of outside surfaces of the plurality of stranded wires is cut out when viewed from the direction of the axis.

8. The coil wire rod according to claim 1, wherein a recessed groove extending in the direction of the axis is formed in a part of an outside surface of the conductor.

9. The coil wire rod according to claim 8, wherein the recessed groove has an asymmetric cross-sectional shape with reference to a diametrical direction with respect to the axis.

10. A stator, comprising:

a yoke annular around a center axis;

a plurality of teeth protruding inward in a radial direction from an inside surface of the yoke and arrayed at intervals in a circumferential direction; and coils including the coil wire rod according to claim 1 wound around the teeth, wherein the teeth include a tooth body connected to the inside surface of the yoke and extending in a radial direction and a flange portion overhanging in a circumferential direction from an end portion inward in the radial direction of the tooth body, and in the coil wire rod in contact with any one of the tooth body and the flange portion of a plurality of the coil wire rods included in the coils, at least one of corners facing an outer periphery side with respect to the axis of outside surfaces of the plurality of stranded wires is cut out when viewed from the direction of the axis.

11. The stator according to claim 10, wherein in the coil wire rod in contact with any one of the tooth body and the flange portion of the plurality of the coil wire rods included in the coils, at least one of the corners facing an outer periphery side with respect to the axis of outside surfaces of the plurality of stranded wires forms an arc shape when viewed from the direction of the axis.

12. The stator according to claim 10, wherein in the coil wire rod in contact with any one of the tooth body and the flange portion of the plurality of the coil wire rods included in the coils, at least one of the corners facing an outer periphery side with respect to the axis of outside surfaces of the plurality of stranded wires forms a flat shape expanding in a direction orthogonal to a radial direction with respect to the axis when viewed from the direction of the axis.

13. A stator, comprising:

a yoke annular around a center axis;

a plurality of teeth protruding inward in a radial direction from an inside surface of the yoke and arrayed at intervals in a circumferential direction; and coils including the coil wire rod according to claim 1 wound around the teeth, wherein the teeth include a tooth body connected to the inside surface of the yoke and extending in a radial direction and a flange portion overhanging in a circumferential direction from an end portion inward in the radial direction of the tooth body, and in the coil wire rod located at a connection portion between the tooth body and the flange portion of a plurality of the coil wire rods included in the coils, at least one of corners facing an outer periphery side with respect to the axis of outside surfaces of the plurality of stranded wires is cut out when viewed from the direction of the axis.

14. The stator according to claim 13, wherein in the coil wire rod located at a connection portion between the tooth body and the flange portion of the plurality of the coil wire rods included in the coils, at least one of the corners facing an outer periphery side with respect to the axis of outside surfaces of the plurality of stranded wires forms an arc shape when viewed from the direction of the axis.

15. The stator according to claim 13, wherein in the coil wire rod located at a connection portion between the tooth body and the flange portion of the plurality of the coil wire rods included in the coils, at least one of the corners facing an outer periphery side with respect to the axis of outside surfaces of the plurality of stranded wires forms a flat shape expanding in a direction orthogonal to a radial direction with respect to the axis when viewed from the direction of the axis.

16. The stator according to claim 13, wherein in the coil wire rod located at a connection portion between the tooth body and the flange portion of the plurality of the coil wire rods included in the coils, at least one of the corners facing an inner periphery side with respect to the axis of outside surfaces of the plurality of stranded wires is cut out when viewed from the direction of the axis.

17. The stator according to claim 13, wherein in the coil wire rod located outside in a circumferential direction of the flange portion of the plurality of the coil wire rods included in the coils, at least one of the corners facing an outer periphery side with respect to the axis of outside surfaces of the plurality of stranded wires is cut out when viewed from the direction of the axis.

18. An electric motor, comprising:

a rotor extending along a center axis; and the stator according to claim 13 covering the rotor from an outer periphery side.

* * * * *